United States Patent [19]

Kitakami et al.

[11] Patent Number: 5,031,097
[45] Date of Patent: Jul. 9, 1991

[54] DIRECT MEMORY ACCESS CONTROLLER

[75] Inventors: Naoichi Kitakami; Yuichi Nakao; Hiroyuki Kondo; Hideharu Toyomoto; Koji Tsuchihashi, all of Itami, Japan

[73] Assignee: Mitsubishi Denki Kabushiki Kaisha, Tokyo, Japan

[21] Appl. No.: 398,815

[22] Filed: Aug. 25, 1989

[30] Foreign Application Priority Data

Mar. 30, 1989 [JP] Japan .................................. 1-083186

[51] Int. Cl.⁵ .......................... G11C 7/00; G06F 7/00
[52] U.S. Cl. ............................... 364/200; 365/189.05; 365/189.01
[58] Field of Search ............. 364/200.07; 365/189.01, 365/189.05, 189.04

[56] References Cited

U.S. PATENT DOCUMENTS 4,750,107  6/1988  Buggert .............................. 364/200
4,847,750  7/1989  Daniel ................................ 364/200

FOREIGN PATENT DOCUMENTS 3129296  3/1982  Fed. Rep. of Germany .

OTHER PUBLICATIONS

Microprocessor and Peripheral Handbook, vol. I Microprocessor (87) Intel Corp.

Primary Examiner—Alyssa H. Bowler
Attorney, Agent, or Firm—Townsend and Townsend

[57] ABSTRACT

A direct memory access controller has a data assembly function by means of a single temporary register. This single register used for a number of channels replaces temporary registers which have been necessary for the respective channels to carry out channel transition during data assembly. By controlling channel transition during data assembly, it is possible to carry out DMA transfers in which channel transition is made during data assembly, thereby preventing an increase in the chip size.

6 Claims, 15 Drawing Sheets

FIG. 2 (b)

| INPUT CONDITION | | | | | OUTPUT | | |
|---|---|---|---|---|---|---|---|
| CHANNEL TRANSITION REQUEST | SAME CHANNEL DMA REQUEST | ASSEMBLING IN I/O-TO-MEMORY MODE | ASSEMBLING IN OTHER TRANSFER MODE | NOT ASSEMBLING | CHANNEL TRANSITION PROCESS REQUEST | DMA REQUEST | CHANNEL TRANSITION AUTHORIZATION |
| 0 | 0 | X | X | X | 0 | 0 | 0 |
| 0 | 1 | X | X | X | 0 | 1 | 0 |
| 1 | X | 1 | 0 | 0 | 1 | 0 | *0→1 |
| 1 | X | 0 | 1 | 0 | 0 | 0 | 1 |
| 1 | X | 0 | 0 | 1 | 0 | 0 | 1 |

*0→1 ··· ASSERT TO "1" AFTER CHANNEL TRANSITION

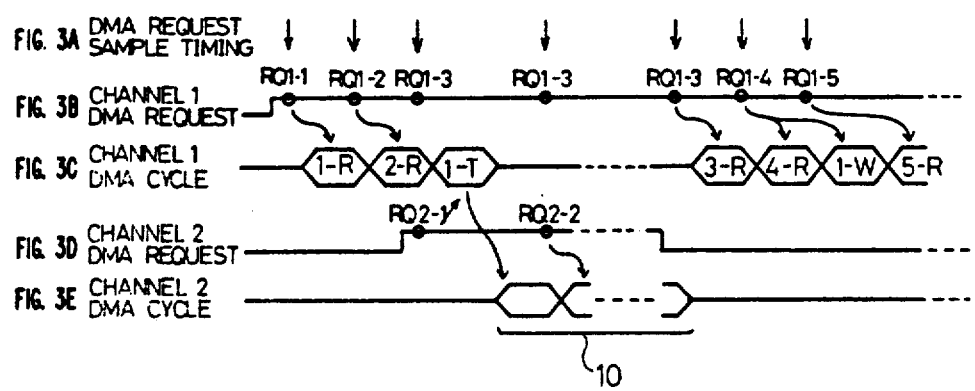
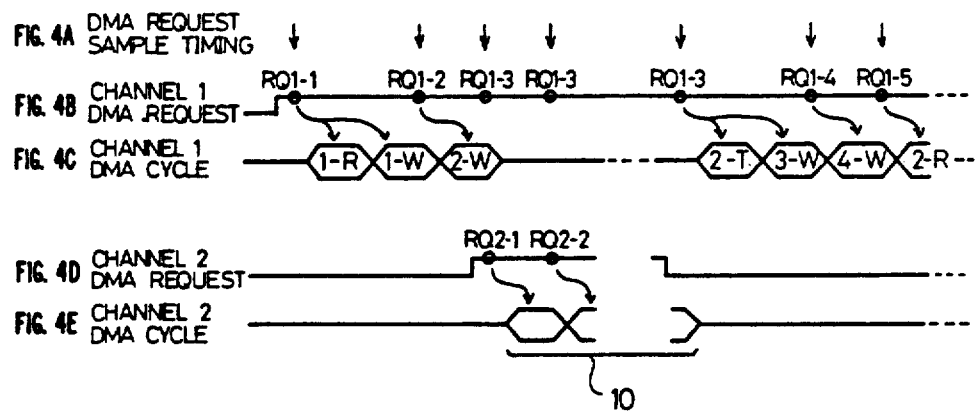

F I G. 3
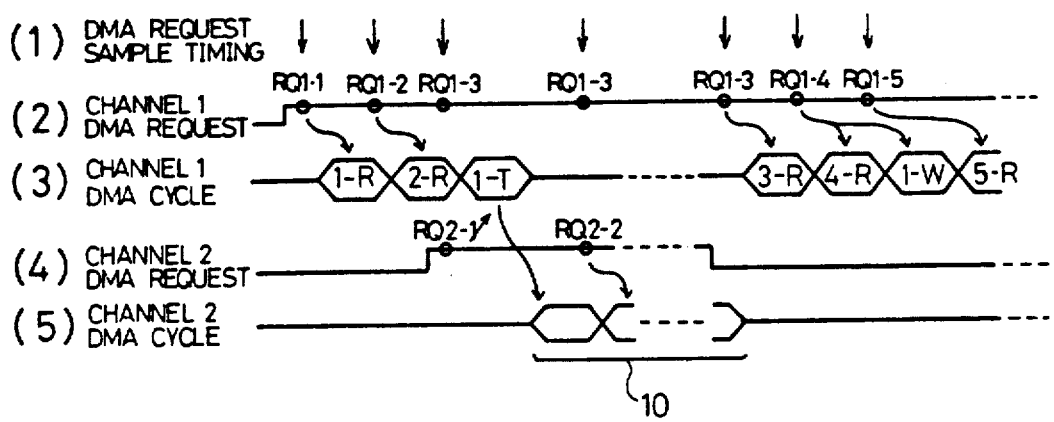
F I G. 4
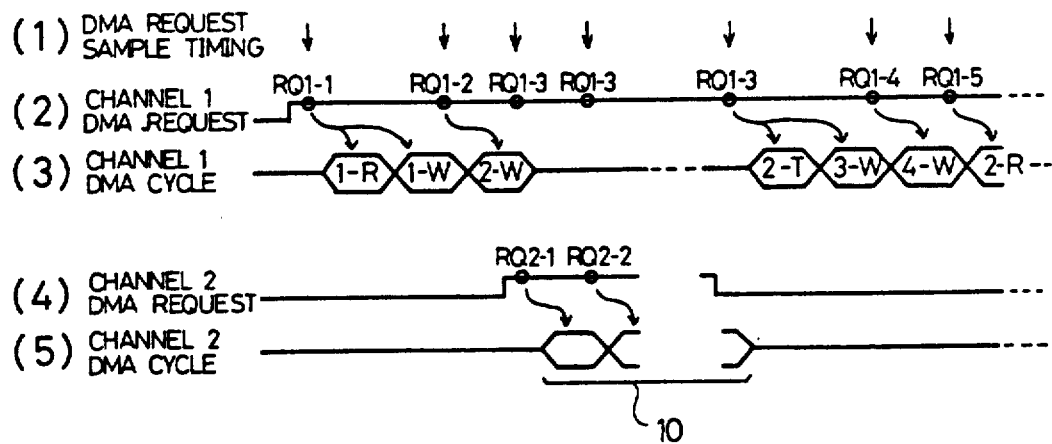

F I G. 5 (b)

| INPUT CONDITION | | | | | OUTPUT | | |
|---|---|---|---|---|---|---|---|
| CHANNEL TRANSITION REQUEST | SAME CHANNEL DMA REQUEST | ASSEMBLING IN I/O-TO-MEMORY MODE | ASSEMBLING IN OTHER TRANSFER MODE | NOT ASSEMBLING | CHANNEL TRANSITION PROCESS REQUEST | DMA REQUEST | CHANNEL TRANSITION AUTHORIZATION |
| 0 | 0 | x | x | x | 0 | 0 | 0 |
| 0 | 1 | x | x | x | 0 | 1 | 0 |
| 1 | 0 | 1 | 0 | 0 | 1 | 0 | 0→1 |
| 1 | 0 | 0 | 1 | 0 | 0 | 0 | 1 |
| 1 | 0 | 0 | 0 | 1 | 0 | 0 | 1 |
| 1 | 1 | 1 | 0 | 0 | 0 | 1 | 0 |
| 1 | 1 | 0 | 1 | 0 | 0 | 1 | 0 |
| 1 | 1 | 0 | 0 | 1 | 0 | 0 | 1 |

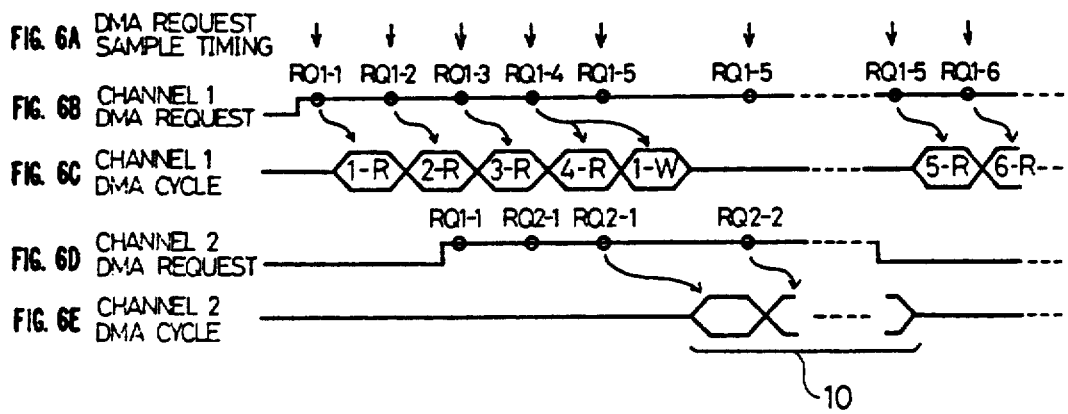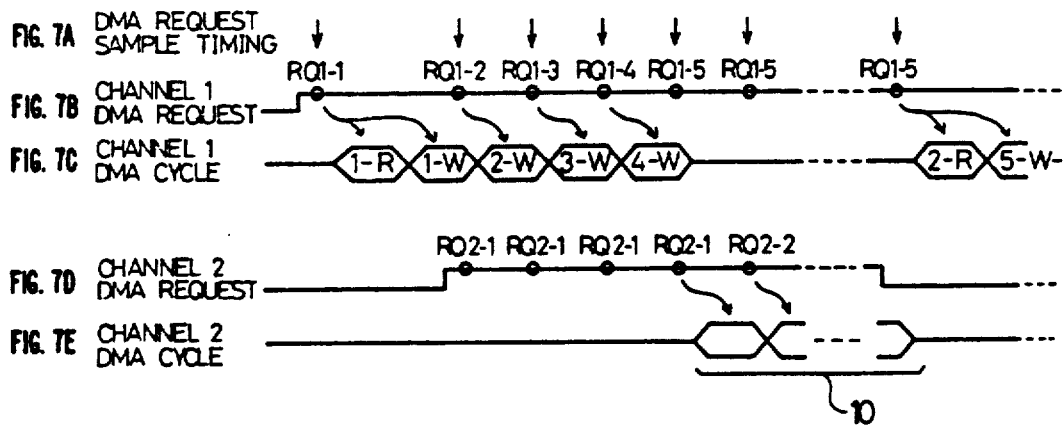

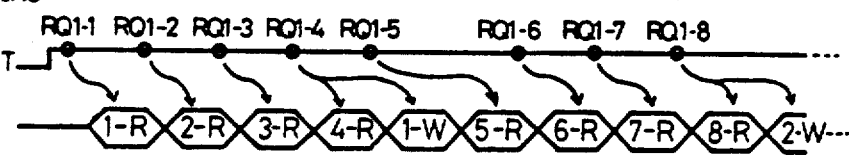
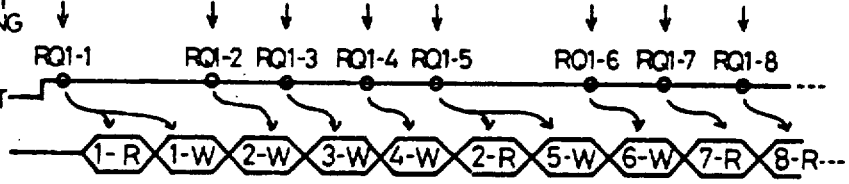

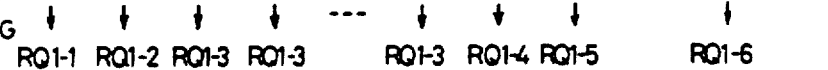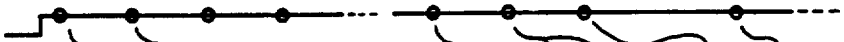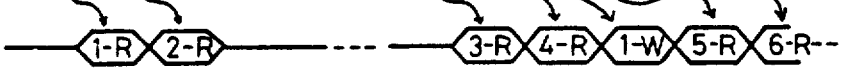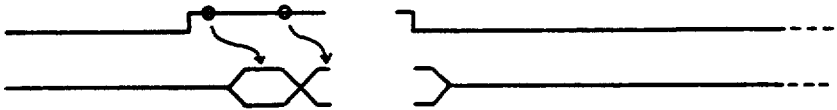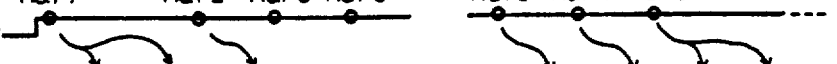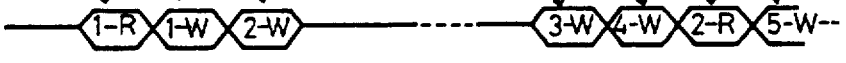

DIRECT MEMORY ACCESS CONTROLLER

BACKGROUND OF THE INVENTION

This invention relates to a direct memory access (DMA) controller not only having a data assembly (or funneling) function but also capable of carrying out transition between channels according to priority levels.

The DMA transfer systems include a dual address mode system which outputs first the address of a source device to transfer data from the source device to the DMA transfer data holding register (temporary register) of a DMA controller and then the address of a destination device to transfer the data from the temporary register to the destination device. Some of the dual address mode DMA controllers have a data assembly function. For example, where a 32-bit DMA controller transfers data from an input/output (I/O) unit with a 8-bit port to a memory with a 32-bit data bus width, four bytes data are transferred to a temporary register in response to DMA requests and, then, all the 32-bit data are transferred at once to predetermined areas of the memory. Where data is transferred from the 32-bit memory to the 8-bit port I/O unit, 3 bytes of data in excess of the necessary 1 byte data are also transferred from the memory to the temporary register in response to the first DMA request, and transfers are carried out from the temporary register to the I/O unit in the subsequent three DMA requests.

The DMA controller having such a data assembly function is provided with temporary registers dedicated for each channel so that channel transition during data assembly is carried out instantly. This is made possible by the fact that the remaining data in channel transition during data assembly is held in the temporary register.

A conventional 2-channel DMA controller will be described with reference to FIGS. 8-13.

FIG. 8 shows a system with a conventional DMA controller. This system includes a 32-bit DMA controller 1, a 32-bit central processing unit (CPU) 2, the first 8-bit input/output unit (I/O) 3, the second 8-bit input/output unit (I/O) 4, a memory 5 with a 32-bit data bus width, a 32-bit data bus for connecting the DMA controller 1, the CPU 2, and the memory 5, the first 8-bit data bus 7 for connecting the first 8-bit I/O unit 3 and the 32-bit data bus 6, the second 8-bit data bus 8 for connecting the second 8-bit I/O unit 4 and the 32-bit data bus, the first and second 32-bit (four byte) long temporary registers 11 and 12 provided within the DMA controller 1, and the first and second memory areas 51 and 52 within the memory 5.

The DMA controller 1 is programmed to perform DMA transfers between the I/O unit 3 and the memory area 51 (the leading address 1a) and between the I/O unit 4 and the memory area 52 with the aid of each of the temporary registers 11 and 12 and to assign a higher priority to the DMA transfers on the side of the I/O unit 4 than on the side of the I/O unit 3. For the purpose of simplification, the path from the I/O unit 3 to the temporary register 11 to the memory area 51 is hereinafter called "channel 1" and the path from the I/O unit 4 to the temporary register 12 to the memory area 52 is hereinafter called "channel 2."

FIG. 9 shows in a block form the essential part of the conventional DMA controller 1, which includes a transfer request control 13 to control DMA transfer requests output by each I/O unit 3, 4 or software (memory-to-memory DMA transfer) according to predetermined priority levels for carrying out DMA request or channel designation; registers 14 and 15 in which DMA control information, such as a source address, a target address, and an I/O-to-memory, memory-to-I/O, or memory-to-memory transfer mode, is set by the CPU 2 for each channel before DMA transfer, and a selector 16 responsive to a channel designation signal from the transfer request control 13 to select the desired control information.

It further includes a DMA transfer control logic 17 which receives a DMA request signal from the transfer request control 13 and controls DMA transfers, such as outputs of source and destination addresses and temporary registers, in response to DMA control information from the register 14 or 15 through the selector 16; and a selector 18 responsive to a channel designation signal from the transfer request control 13 to switch the output of the DMA transfer control logic 17 to either the temporary register 11 or 12.

FIGS. 10-13 illustrate timing of various DMA transfers in the above conventional system, wherein RQ1-1, RQ1-2, ... represent DMA requests in the channel 1, RQ2-1, RQ2-2, ... DMA requests in the channel 2, 1-R, 2-R, ... transfer cycles from the I/O unit 3 or the memory area 51 to the temporary register 11, 1-W, 2-W, ... transfer cycles from the temporary register 11 to the memory area 51 or the I/O unit 3.

In operation, first of all, explanation is made with reference to FIGS. 10-11, wherein there are no channel transition requests; i.e., no DMA requests in the channel 2 occur during DMA transfer in the channel 1.

FIG. 10 illustrate the case where DMA transfers are made from the I/O unit 3 to the memory area 51. The transfer request control 13 first responds to the DMA request RQ1-1 to set each channel selector 16, 18 to the channel 1, and the DMA transfer control logic 17 transfers 8-bit data to the 8-bit register 1A of the temporary register 11 via the data buses 7, 6. Then, it sequentially responds to the DMA requests RQ1-2, RQ1-3, and RQ1-4 to sequentially transfer the data to respective 8-bit registers 1B, 1C, and 1D (2-R, 3-R, and 4-R). When the data is transferred to the 8-bit register 1D, the 32 bits of data, with which the temporary register 11 is now filled, are transferred all at once to the memory area 51 at the addresses 1a, 1b, 1c, and 1d (1-W). Subsequently, this cycle is repeated. The channel transition due to a channel transition request made during a period between the transfer cycles 1-R and 3-R is called "channel transition during data assembly."

FIG. 11 illustrates the case where DMA transfers are made from the memory area 51 to the I/O unit 3. In response to the first DMA request RQ1-1, 32 bits of data are transferred all at once from the memory area 51 at the addresses 1a, 1b, 1c, and 1d to the temporary register 11 (1-R). Only 8 bits of the data which have been transferred to the 8-bit register 1A of the temporary register 11 are transferred to the I/O unit 3 (1-W). Then, 8-bit data is sequentially transferred to the I/O unit 3 from the respective 8-bit registers 1B, 1C, and 1D of the temporary register 11 according to the DMA requests RQ1-2, RQ1-3, and RQ1-4 (2-W, 3-W, and 4-W). The channel transition due to a channel transition request made during a period between the transfer cycles 1-W and 3-W is called "channel transition during data assembly."

FIGS. 12-13 illustrate the cases where a channel transition request occurs during data assembly for channel transition; i.e., a DMA request in the channel 2 takes place during data assembly in the DMA transfer in the channel 1 for transition to the channel 2.

FIG. 12 illustrates the case where a channel transition request RQ2-1 occurs during the second data transfer (2-R) from the I/O unit 3 to the temporary register 11 in DMA transfer from the I/O unit 3 to the memory area 51. As soon as the 2-R cycle is completed, the transfer request control 13 switches the respective selectors 16 and 18 to the channel 2 for carrying out DMA transfer 10. At this point, the channel 2 uses the dedicated temporary register 12. If there is still the channel-1 DMA request RQ1-3 when all channel-2 DMA requests RQ2 end, transition is made to the channel 1 to continue carrying out DMA transfers (3-R and subsequent transfers).

FIG. 13 illustrates the case where a channel transition request RQ2-1 takes place during the second data transfer (2-W) from the temporary register 11 to the I/O unit 3 in DMA transfer from the memory area 51 to the I/O unit 3. The channel transition is made in the same manner as that of FIG. 12.

As has been described above, the number of temporary registers in the conventional DMA controller must be equal to that of channels, resulting in the increased chip size.

SUMMARY OF THE INVENTION

Accordingly, it is an object of the invention to provide a DMA controller capable of channel transition with a single temporary register regardless the number of channels.

According to an aspect of the invention, there is provided a DMA controller which includes a single temporary register used for each channel and a channel transition control unit for carrying out channel transition during data assembly in transfer from the I/O unit to the memory after all the data transferred from I/O unit to the temporary register is transferred to the specified area of a memory but instantly carrying out channel transition during data assembly in transfer from the memory to the I/O unit so that DMA transfers in which channel transition is made during data assembly are carried out without difficulties, thus preventing an increase in the chip size.

According to another aspect of the invention, there is provided a DMA controller including a channel transition control unit which does not carry out channel transition until the data assembly and its transfer are completed if there are a channel transition request during data assembly and a DMA request in the same channel as during the data assembly but carrying out the same channel transition as described above if there are no DMA requests in the same channel, thus not only preventing an increase in the chip size but also increasing the transfer efficiency.

The above and other objects, features, and advantages of the invention will become more apparent from the following description when taken in conjunction with the accompanying drawings.

BRIEF DESCRIPTION OF THE DRAWINGS

FIG. 2a is a block diagram of the essential part of a DMA controller according to an embodiment of the invention;

FIG. 2b is a table showing the relationship between input and output conditions of the DMA controller of FIG. 2a;

FIGS. 3 and 4 are timing diagrams showing operations of the DMA controller of FIG. 2a;

FIG. 5b is a table showing the relationship between input and output conditions of the DMA controller of FIG. 5a;

FIGS. 6 and 7 are timing diagrams showing operations of the DMA controller of FIG. 5a;

DESCRIPTION OF THE PREFERRED EMBODIMENT

Figure 1:
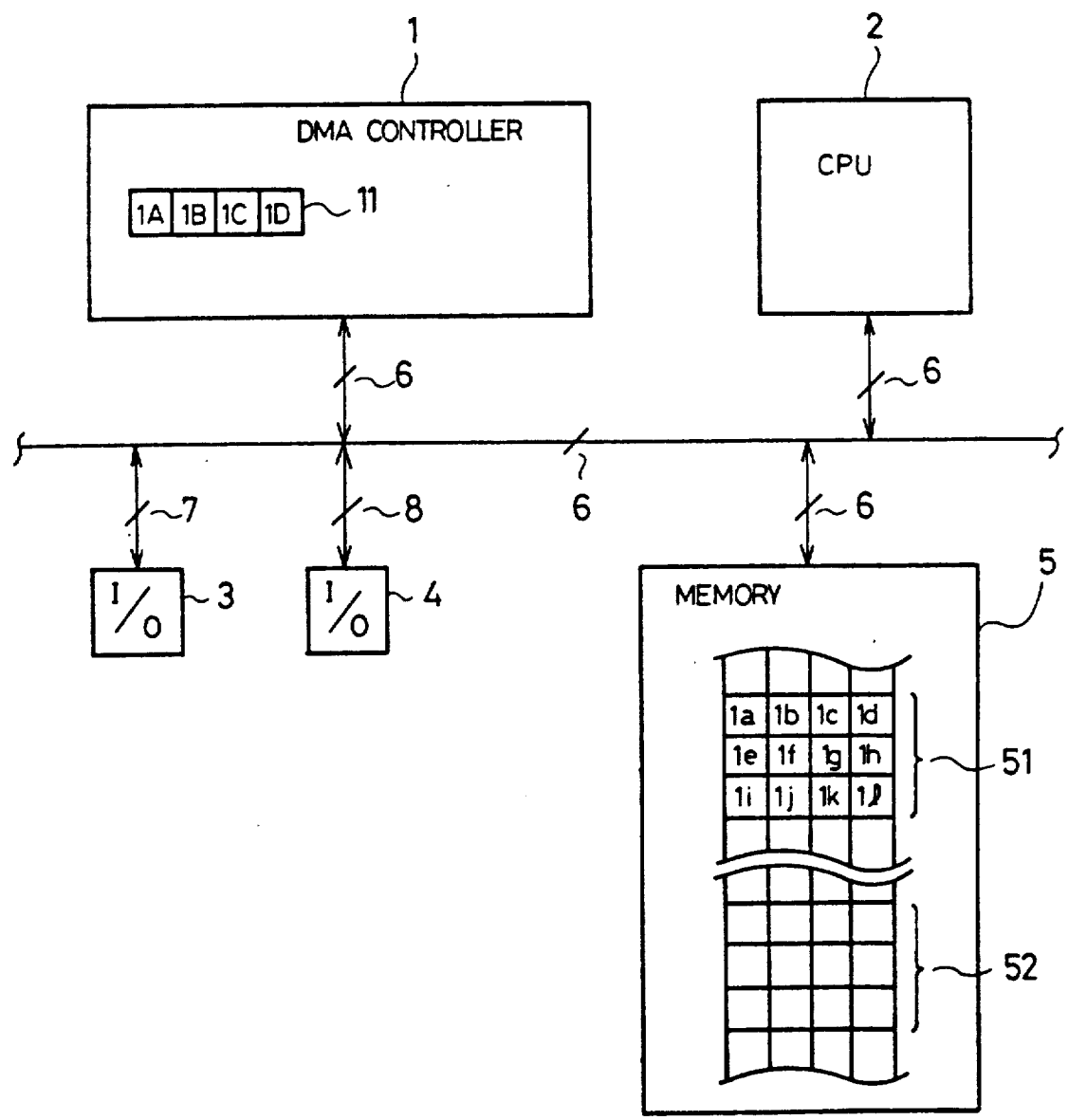
FIG. 1 is a block diagram of a system including a DMA controller according to the invention.
Figure 8:
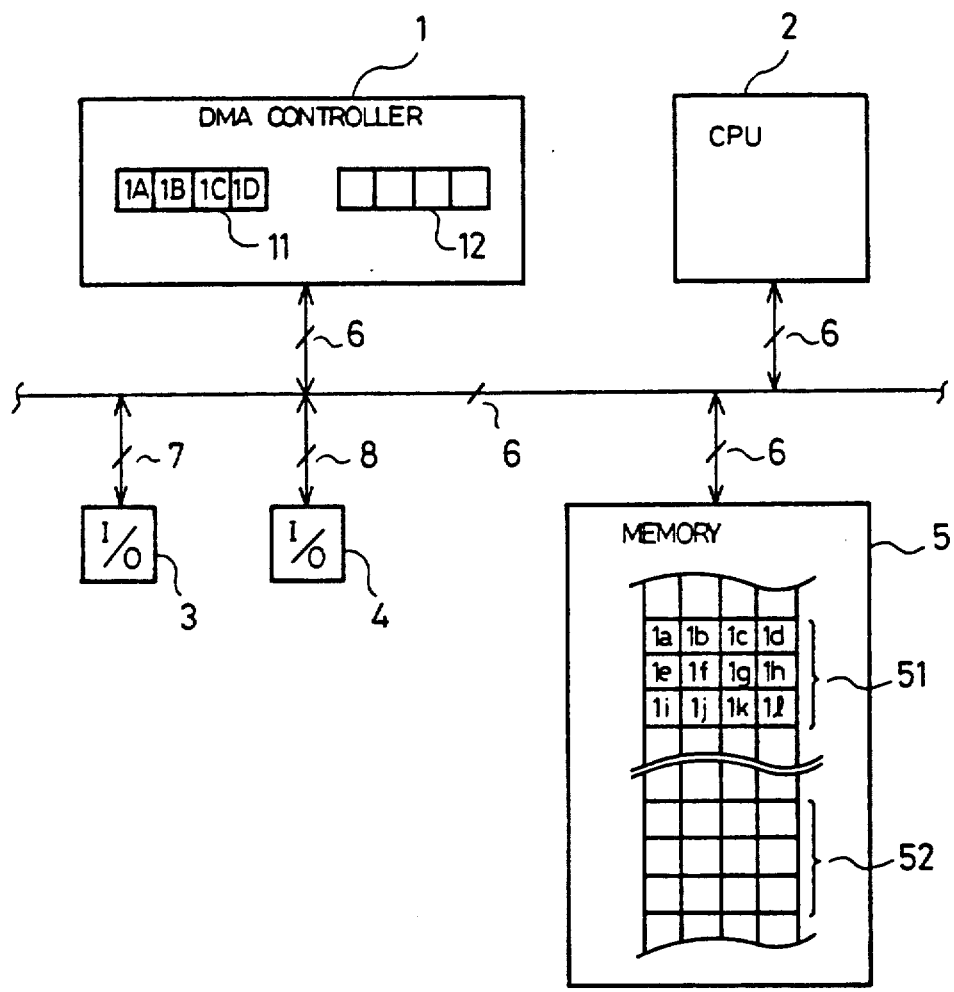
FIG. 8 is a block diagram of a system including a conventional DMA controller.

In FIG. 1, components 1-8, 11, 51, and 52 are identical with or equivalent to those of FIG. 8. However, it should be noted that the temporary register 12 of FIG. 8 is eliminated and that the single temporary register 11 is used for both channels 1 and 2.

Figure 2:
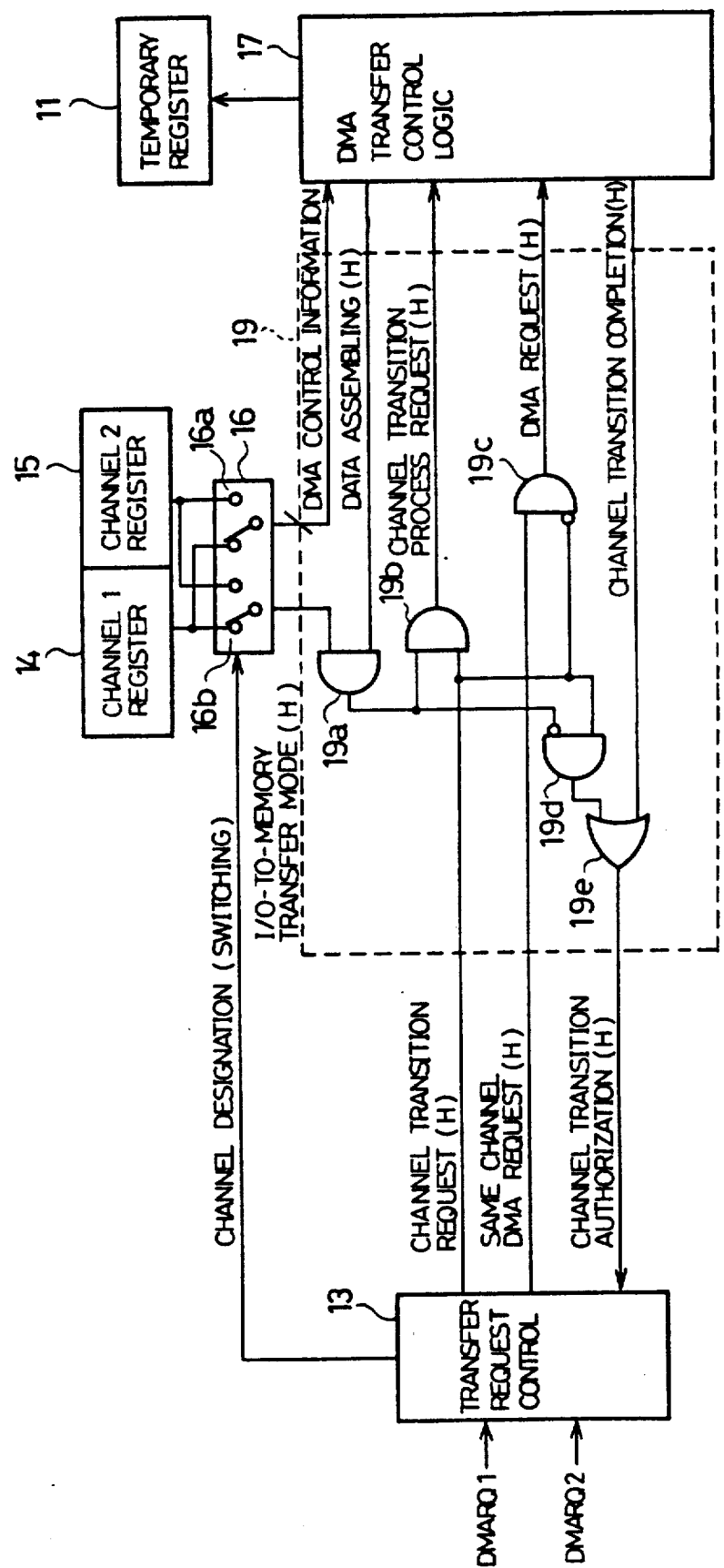
Figure 9:
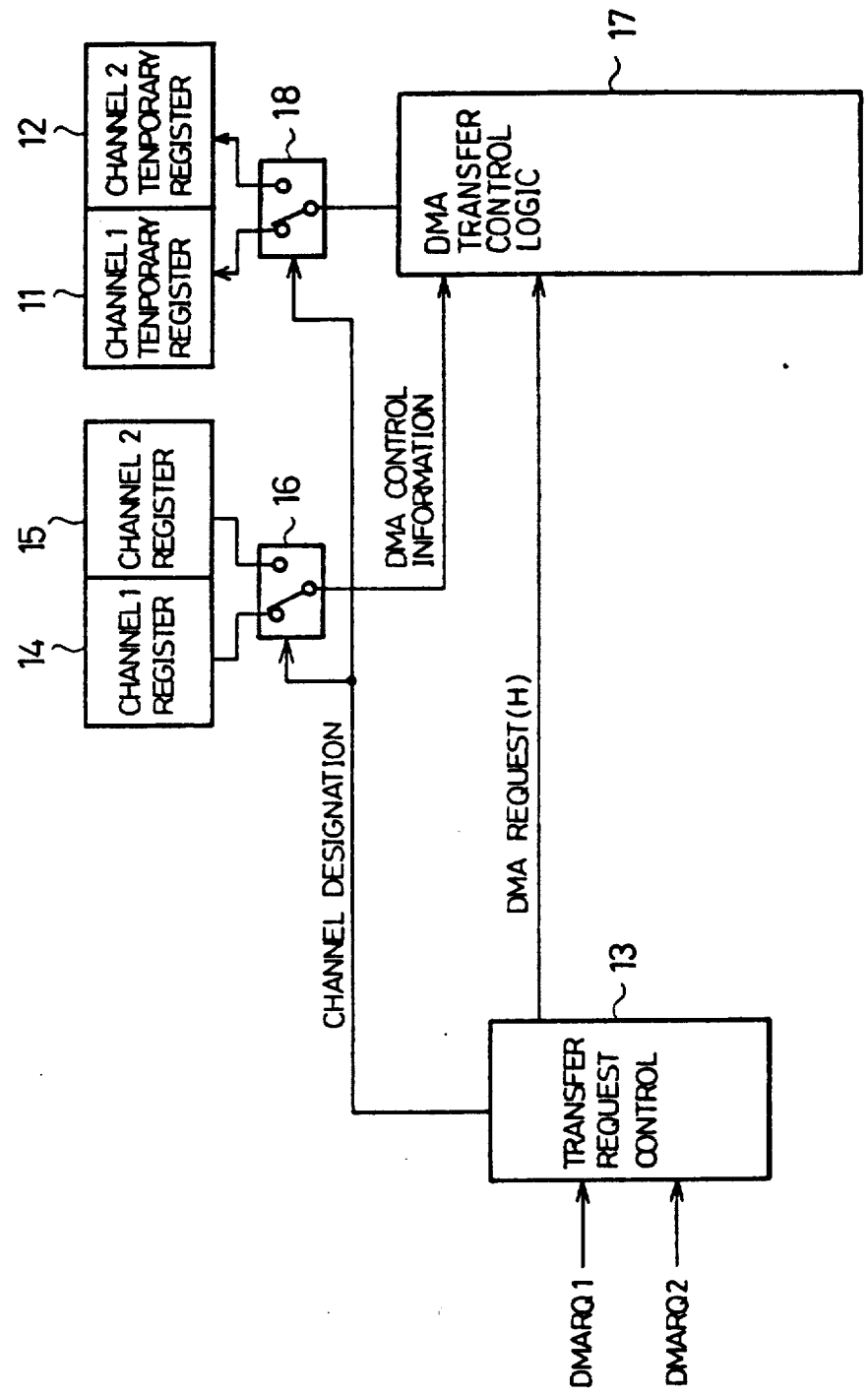
FIG. 9 is a block diagram of the essential part of the conventional DMA controller.
Figure 10:
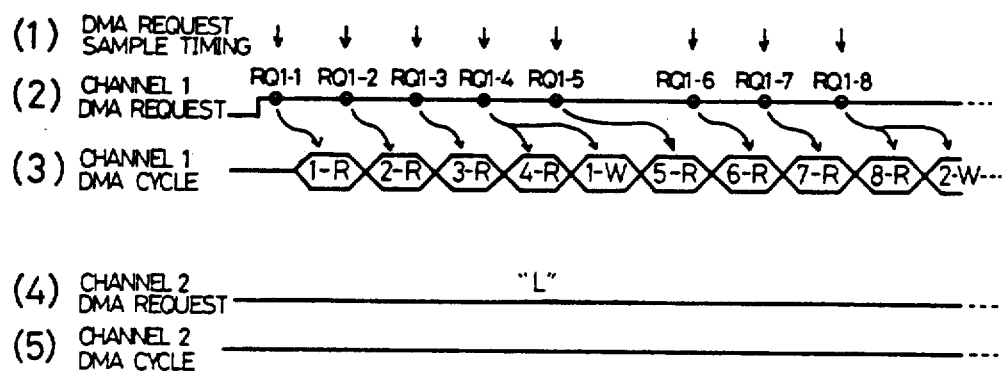
FIGS. 10-13 are timing diagrams showing operations of the conventional DMA controller.
Figure 11:
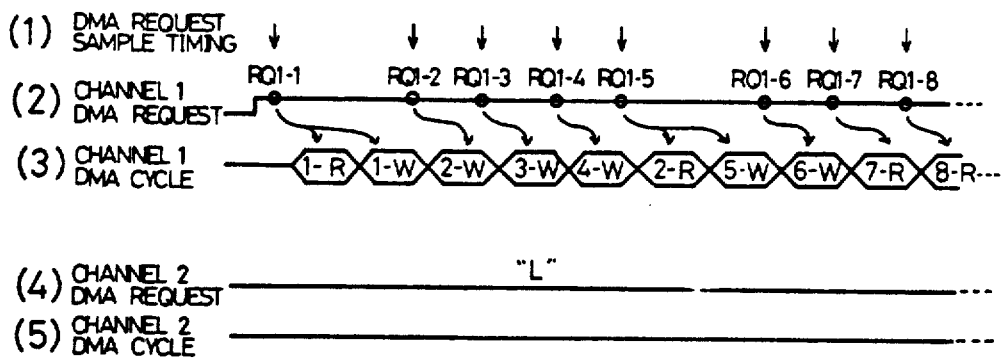
Figure 12:
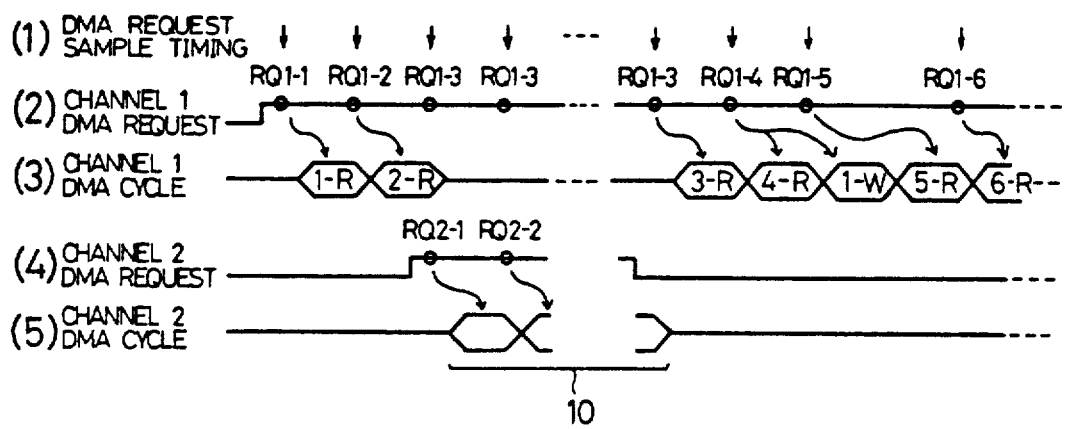
Figure 13:
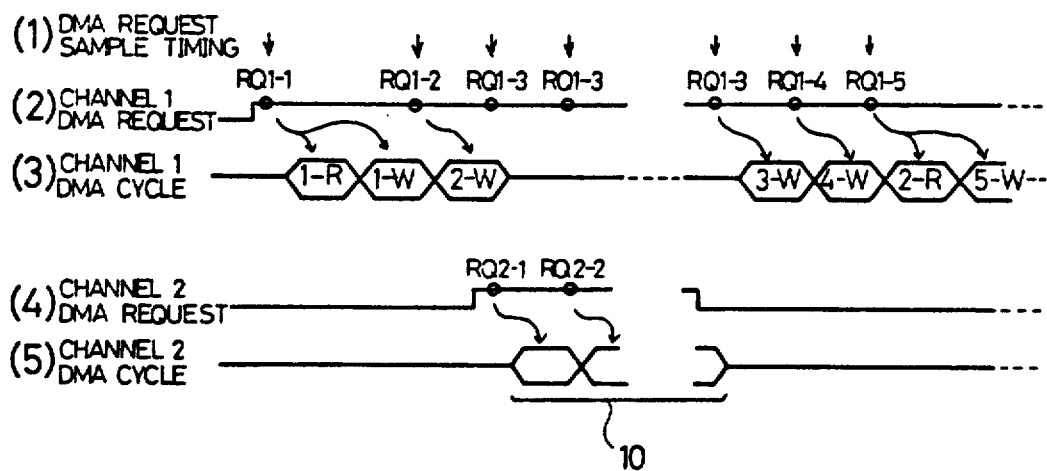

In FIG. 2a, components 11 and 13-17 are identical with or equivalent to those of FIG. 9. However, it should be noted that the temporary register 12 and the selector 18 of FIG. 9 are replaced by a channel transition control unit 19. The transfer request control 13 outputs a same channel DMA request and a channel transition request in place of the conventional DMA request and makes channel designation in response to a channel transition authorization from the channel transition control unit 19. The selector 16 has a contact 16a for switching DMA control information to the DMA transfer control logic 17 in the same manner as in the conventional and a contact 16b for switching transfer mode information which is necessary for the channel transition control unit 19. The DMA transfer control logic 17 feeds the channel transition control unit 19 with a signal indicative of data assembly being in process and a signal indicative of completion of channel transition and receives a channel transition process request and a DMA request from the channel transition control unit 19. That is, in response to a channel transition authorization signal, the transfer request control 13 switches channels and asserts the same channel request, if it is not done yet, and negates channel transition requests. Then, the DMA transfer control logic 17 receives the switched DMA control information and DMA request and carries out DMA transfer to a new channel with the aid of the same temporary register 11.

The channel transition control unit 19 includes an AND gate 19a which receives from the contract 16b a signal at "H" level in the I/O-to-memory transfer mode and from the DMA transfer control logic 17 a signal at "H" level during data assembly; an AND gate 19b which receives a signal from the AND gate 19a and an "H" level significant channel transfer request from the transfer request control 13 and feeds the DMA transfer control logic 17 with an "H" level significant channel transition process request; an AND gate 19c which receives an inverted signal of the channel transition request and an "H" level significant same channel DMA request and feeds the DMA transfer control logic 17 with an "H" level significant DMA request; an AND gate 19d which receives an inverted signal from the AND gate 19a and the channel transition request; and an OR gate 19e which receives a signal from the AND gate 19d and an "H" level significant channel transition process completion signal and feeds the transfer request control 13 with an "H" level significant channel transition authorization signal.

The respective input conditions and the corresponding output states are shown in FIG. 2b.

Timing of various DMA transfers is shown in FIGS. 3 and 4, wherein RQ1-1, RQ-2, ...; RQ2-1, RQ2-2, ...; 1-R, 2-R, ...; and 1-W, 2-W, ... are equivalent to those of FIGS. 10–13, and 1-T and 2-T are transfer cycles which are necessary for this embodiment.

FIG. 3 illustrates the DMA transfer from the I/O unit 3 to the memory area 51 in which a channel transition request RQ2-1 takes place at the time of the second data transfer 2-R from the I/O unit 3 to the temporary register 11. Upon completion of the 2-R cycle, the data, which has been transferred to the 8-bit registers 1A and 1B of the temporary register 11 from the I/O unit 3, is transferred to the memory area 51 at the addresses 1a and 1b (1-T) and then to the channel 2 for carrying out a DMA transfer 10. Thus, the use of the common temporary register 11 in the channel 2 does not affect DMA transfer data in the channel 1. If the DMA request RQ1-3 in the channel 1 continues to exist when the DMA requests RQ2 in the channel 2 end, transition is made to the channel 1 to carry out the third DMA transfer (3-R) and subsequent DMA transfers. However, at the transfer cycle 1-W to the memory 5, only 16 bits of data transferred to the 8-bit registers 1C and 1D of the temporary register 11 are transferred to the memory area 51 at the addresses 1c and 1d in response to the third and fourth DMA requests.

FIG. 4 illustrates the DMA transfer from the memory 51 to the I/O unit 3 in which a channel transition request RQ2-1 takes place at the second data transfer (2-W) from the temporary register 11 to the I/O unit 3. Upon completion of the cycle 2-W, transition is made to the channel 2 to carry out a DMA transfer 10. This DMA transfer 10 erases the data remaining in the 8-bit registers 1C and 1D of the channel 1. However, this presents no problems because the data is not in response to the corresponding DMA request. If there is still the DMA request RQ1-3 in the channel 1 when all the DMA requests RQ2 of the channel 2 end, transition is made to the channel 2. Since no data of the channel 1 is left in the temporary register 11 at this point, data is transferred from the memory area 51 at the addresses 1c and 1d to the 8-bit registers 1C and 1D of the temporary register 11 (2-T) and, then, to the I/O unit 3 (3-W, 4-W). Although a continuing DMA request in the same channel along with a channel transition request has been described in the various DMA transfers, the same channel transition is carried out during data assembly for intermittent DMA requests in the same channel along with channel transition requests between the intermittent DMA requests.

The transfer efficiency may be increased in some cases by setting the conditions, under which channel transition during data assembly is accepted and carried out, such that no channel transition is made if there is a DMA request in the same channel as during data assembly along with a channel transition request, but channel transition is carried out in the same manner as in the above embodiment if there is no DMA requests in the same channel.

Figure 5A:
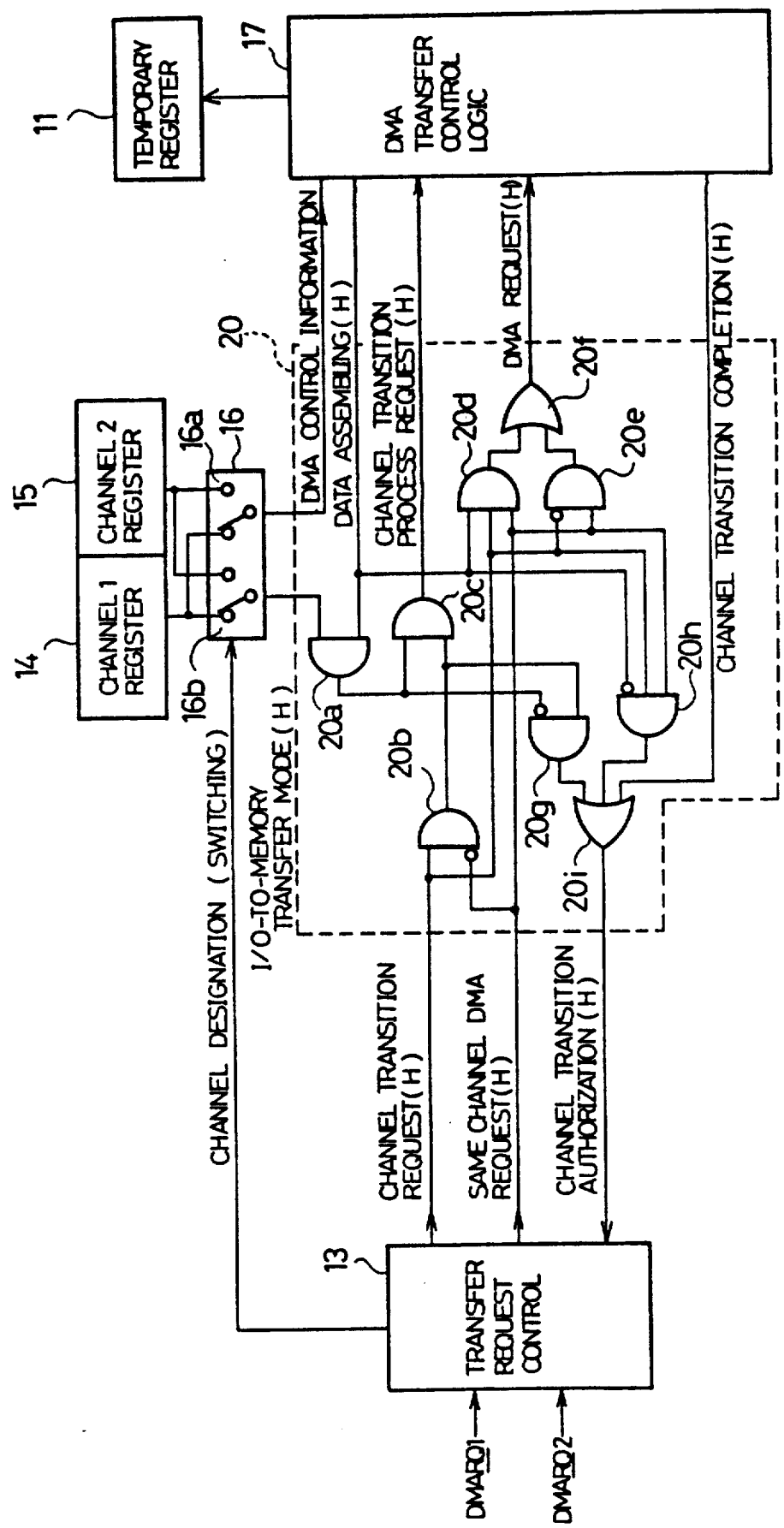
FIG. 5a is a block diagram of the essential part of a DMA controller according to another embodiment of the invention.

FIG. 5a shows in a block form the essential part of a DMA controller 1 for carrying out such a function according to another embodiment of the invention. This DMA controller is identical with that of FIG. 2a except that a channel transition control unit 20 is different from the channel transition control unit 19 in terms of internal structure. The channel transition control unit 20 includes an AND gate 20a which receives from the contact 16b a signal at "H" level in the I/O-to-memory transfer mode and from the DMA transfer control logic 17 a signal at "H" level during data assembly; an AND gate 20b which receives from the transfer request control 13 an "H" level significant channel transition request and an inverted "H" level significant same channel DMA request; an AND gate 20c which receives signals from the AND gates 20b and 20a; an AND gate 20d which receives a signal indicating that data assembly is in process and channel transition and same channel DMA requests; an AND gate 20e which receives an inverted signal of the channel transition request and the same channel DMA request; an OR gate 20f which receives signals from the AND gates 20d and 20e and feeds the DMA transfer control logic 17 with an "H" level significant DMA request; an AND gate 20g which receives an inverted signal from the AND gate 20a and a signal from the AND gate 20b; an AND gate 20h which receives an inverted signal of the signal indicating that data assembly is in process and the channel transition and same channel DMA requests; and an OR gate 20i which receives signals from the AND gates 20g and 20h and an "H" level significant channel transition process complete signal from the DMA transfer control logic 17 and feeds the transfer request control 13 with an "H" level significant channel transition authorization signal. That is, in order to determine whether there is a same channel DMA request along with a channel transition request, the AND gates 20b, 20d, and 20h and the OR gate 20f are added to the channel transition control unit 19 of the first embodiment, and the output of the AND gate 20h is connected to the input of the OR gate 20i.

The respective input conditions and the corresponding output states are shown in FIG. 5b.

Figure 6:
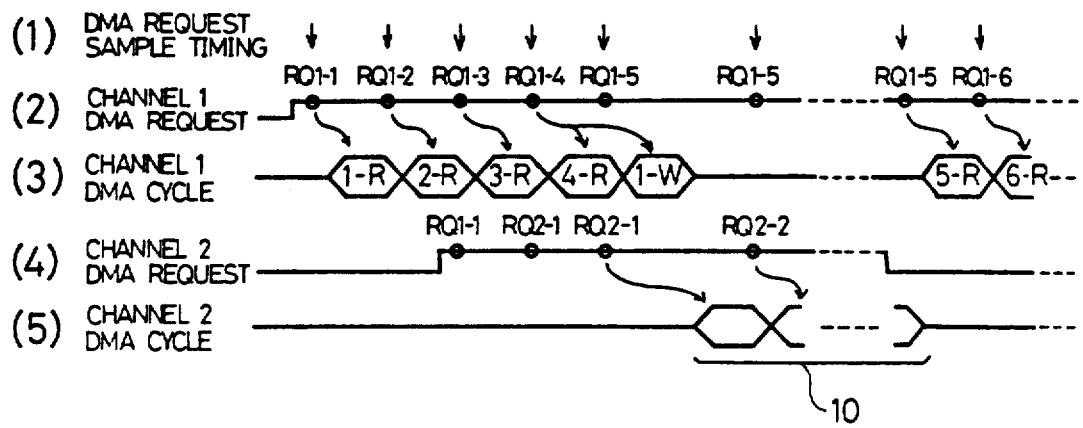
Figure 7:
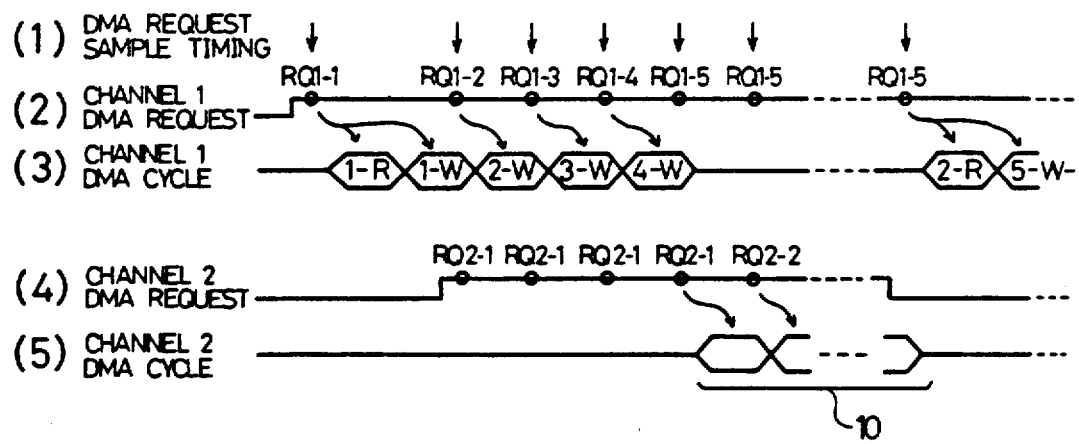

Timing of various DMA transfers in the embodiment is shown in FIG. 6 for transfer from the I/O unit 3 to the memory area 51 and FIG. 7 for transfer from the memory area 51 to the I/O unit 3.

In FIGS. 3 and 6, and 4 and 7, a comparison of transfer cycles in the channel 1 shows that the cycle 1-T in FIG. 3 and the cycle 2-T in FIG. 4 are eliminated in FIGS. 6 and 7, thus increasing the transfer efficiency. From FIG. 5b it is apparent that if there are no same channel requests, channel transition is carried out in the same manner as in the first embodiment.

Although the DMA controllers having only two channels have been described above, the invention is applicable to DMA controllers having more channels, and they need only one temporary register 11 and a channel transition control unit 19 or 20 regardless the number of channels. Although the channel transition control units 19 and 20 have been described using specific terms, many changes and modifications may be made to provide the same function. The 32-bit (four byte) temporary register 11 may be changed according to the system configuration.

As has been described above, according to an embodiment of the invention, the DMA controller is provided with a single temporary register used for each channel and a channel transition control unit for carrying out channel transition during data assembly in transfer from the I/O unit to the memory after all the data transferred from I/O unit to the temporary register is transferred to the specified area of a memory but instantly carrying out channel transition during data assembly in transfer from the memory to the I/O unit so that the DMA transfers in which channel transition occurs during data assembly are carried out without difficulties, thus preventing an increase in the chip size.

According to another embodiment of the invention, there is provided a channel transition control unit which does not carry out channel transition until the data assembly and its transfer are completed if there are a channel transition request during data assembly and a DMA request in the same channel as during the data assembly but carries out the same channel transition as that of the above embodiment if there are no DMA requests in the same channel, thus not only preventing an increase in the chip size but also increasing the transfer efficiency.

What is claimed is:

1. A direct memory access controller having a data assembly function by means of a single temporary register having a length of a plurality of bytes for temporarily storing data to be DMA transferred between a plurality of input/output units and a memory and controlling not only DMA transfers with the aid of said temporary register in response to a DMA request and a predetermined DMA control information but also DMA transfer requests in each channel according to priority levels to generate a DMA request and a channel designation, thereby carrying out channel transition, characterized in that said temporary register is used for said respective channels and that said controller is provided with channel transition control means for carrying out channel transition during data assembly in transfer from said input/output unit to said memory after all data transferred from said input/output unit to said temporary register is transferred to a predetermined area of said memory and instantly carrying out channel transition during data assembly in transfer from said memory to said input/output unit.

2. The direct memory access controller of claim 1, wherein said channel transfer control means does not carry out channel transition when there are a channel transition request during data assembly and a DMA request in the same channel as during said data assembly but carries out channel transition when there are no DMA requests in the same channel.

3. A direct memory access controller comprising:
   a temporary register (11) having a length of a plurality of bytes for temporarily storing data to be transferred;
   a transfer request control (13) for controlling DMA transfer requests in respective channels according to priority levels to output a same channel DMA request and a channel transition request and generate a channel designation signal in response to a channel transition authorization signal;
   a plurality of DMA control information registers (14, 15) in which DMA control information is set in advance for each channel;
   a selector (16) in response to said channel designation signal from said transfer request control (13) to switch DMA control information and its transfer mode information from said registers (14, 15);
   a DMA transfer control logic (17) which receives said DMA control information, a channel transition process request and a DMA request, outputs a signal indicative of data assembly being in process and a signal indicative of completion of channel transition process, and controls DMA transfer by means of said temporary register (11); and
   channel transition control means (19) which receives a same channel DMA request and a channel transition request from said transfer request control (13), said transfer mode information via said selector (16), and said signals indicative of data assembly being in process and completion of channel transition process and feeds said DMA transfer control logic (17) with a channel transition process request and a DMA request and said transfer request control (13) with a channel transition authorization signal to control channel transition.

4. The direct memory access controller of claim 3, wherein said channel transition control means (19) comprises:
   an AND gate (19a) which receives from said selector (16) a signal at "H" level in an input/output unit-to-memory transfer mode and from said DMA transfer control logic (17) a signal at "H" level during data assembly;
   an AND gate (19b) which receives a signal from said AND gate (19a) and an "H" level significant channel transition request from said transfer request control (13) and feeds said DMA transfer control logic (17) with an "H" level significant channel transfer process request;
   an AND gate (19c) which receives an inverted signal of said channel transition request and an "H" level significant same channel DMA request from said transfer request control 13 and feeds said DMA transfer control logic (17) with an "H" level significant DMA request;
   an AND gate (19d) which receives an inverted signal from said AND gate (19a) and said channel transition request; and
   an OR gate (19e) which receives a signal from said AND gate (19d) and an "H" level significant channel transition process completion signal from said DMA transfer control logic (17) and feeds said transfer request control (13) with an "H" level significant channel transition authorization signal.

5. A direct memory access controller comprising:
   a temporary register (11) having a length of a plurality of bytes for temporarily storing data to be transferred;
   a transfer request control (13) for controlling DMA transfer requests in individual channels according to predetermined priority levels and outputting a same channel DMA request and a channel transition request and carrying out channel designation in response to a channel transition authorization signal;
   a plurality of DMA control information registers (14, 15) in which DMA control information is set in advance for each channel;
   a selector (16) for switching DMA control information and its transfer mode information from said registers (14, 15) in response to a channel designation signal from said transfer request control (13);

a DMA transfer control logic (17) which receives said DMA control information, a channel transition process request and a DMA request and outputs a signal indicative of data assembly being in process and a signal indicative of completion of channel transition process and controlling DMA transfer by means of said temporary register (11) in response to said signals input; and channel transition control means (20) which receives a same channel DMA request and a channel transition request and a transfer mode information via said selector (16), a signal indicative of data assembly being in process and a signal indicative of completion of channel transition process from said DMA transfer control logic (17) and feeds said DMA transfer control logic (17) with a channel transition process request and a DMA request.

6. The direct memory access controller of claim 5, wherein said channel transition control means (20) comprises:

an AND gate (20a) which receives a signal at "H" level in an input/output unit-to-memory transfer mode and a signal at "H" level during data assembly from said DMA transfer control logic (17);

an AND gate (20b) which receives an "H" level significant channel transition request and an inverted signal of an "H" level significant same channel DMA request from said transfer request control (13);

an AND gate (20c) which receives a signal from said AND gate (20b) and a signal from said AND gate (20a) and feeds said DMA transfer control logic (17) with an "H" level significant channel transition process request;

an AND gate (20d) which receives said signal indicative of data assembly being in process, a channel transition request, and a same channel DMA request;

an AND gate (20e) which receives an inverted signal of said channel transition request and a same channel DMA request;

an OR gate (20f) which receives a signal from said AND gate (20d) and a signal from said AND gate (20e) and feeds said DMA transfer control logic (17) with an "H" level significant DMA request;

an AND gate (20g) which receives an inverted signal from said AND gate (20a) and a signal from said AND gate (20b);

an AND gate (20h) which receives an inverted signal of said signal indicative of data assembly being in process, a channel transition request, and a same channel DMA request; and an OR gate (20i) which receives a signal from said AND gate (20g), a signal from said AND gate (20h), and an "H" level significant channel transition process completion signal from said DMA transfer control logic (17) and feeds said transfer request control (13) with an "H" level significant channel transition authorization signal.

* * * * *